INVENTOR:
BORIS VICTORIEN BARLOW
ATTORNEYS:
Hall, Pollack & Vonde Sande

United States Patent Office

3,286,456
Patented Nov. 22, 1966

3,286,456
HOROLOGICAL INSTRUMENTS
Boris Victorien Barlow, Edgware, England, assignor to S. Smith & Sons (England) Limited, London, England, a British company
Filed Sept. 21, 1964, Ser. No. 397,781
3 Claims. (Cl. 58—85.5)

This invention relates to timing devices and is particularly applicable to clocks employing an electric motor which drives indicating and/or control means through a reduction gear train.

According to this invention, there is provided a timing device comprising a motor, a reduction gear train, an indicating and/or control means driven by the motor through the reduction gear train, the reduction gear train having at least one stage comprising an integral cluster of two external gears centred about a first axis, the cluster being adapted to be mounted on a member so as to be rotatable about the first axis, the said member being arranged to be driven about a second axis so that the first axis rotates about the second axis, a fixed internal gear which is centred on the second axis and with which one of the internal gears is in mesh, and a rotatable internal gear rotatable about and centred on the second axis, the rotatable external gear being in mesh with the other external gear.

A motor is to be understood to mean a device which has a rotatable member which rotates at a substantially constant speed and may conveniently be a synchronous electric motor.

The member on which the cluster is adapted to be mounted may be the rotatable internal gear of a preceding stage.

In a timing device which includes indicating means and adjusting means which may be operated to alter the indication given by the indicating means, it is preferred that the fixed internal gear of the, or one of the, stages is frictionally carried by a support whereby when the adjusting means are operated the fixed internal gear slips with respect to the support but otherwise remains stationary with respect to the support.

Preferably the support is cylindrical and the internal gear is mounted within the support.

Preferably the cluster, the fixed internal gear and the rotatable external gear are moulded from a plastics material.

A timing device in accordance with this invention will now be described with reference to the accompanying drawings of which:

Figure 1:
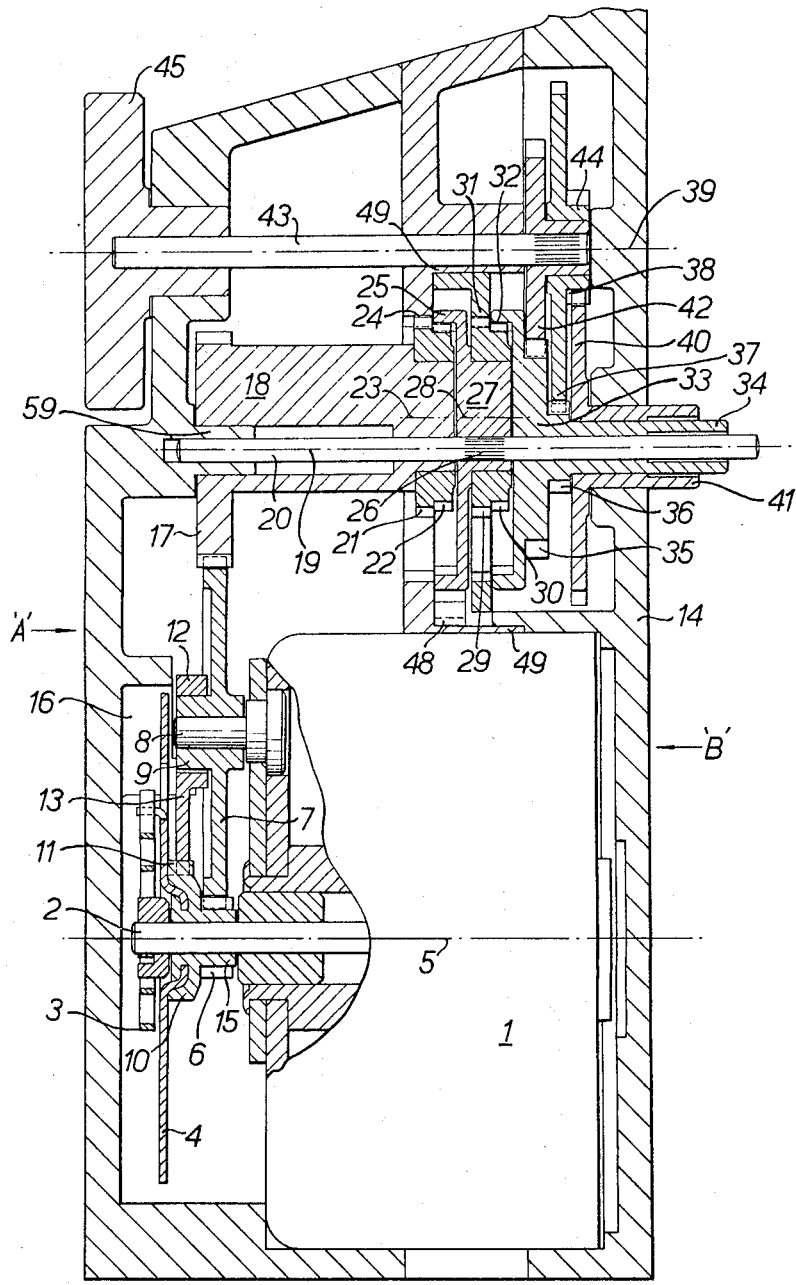
FIGURE 1 is a side elevation of the relevant parts of a clock.
Figure 2:
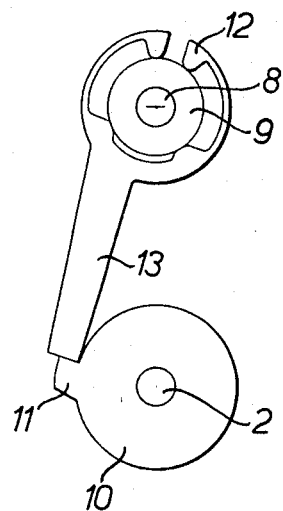
FIGURES 2 and 3 are views of components of the clock in the direction of the arrow A in FIGURE 1.

Referring to FIGURE 1 a single phase synchronous alternating current motor 1 is fixed to a casing 14 and drives a spindle 2 about an axis 5. The motor 1 has a wound stator with fifteen pairs of poles and a permanent magnet ferrite rotor which also has fifteen pairs of poles. The spindle 2 drives, through a hairspring 3, a flywheel 4, which is rotatably mounted on the spindle 2. The flywheel 4 is formed with a sleeve 15 which surrounds the spindle 2 and is formed with external teeth 6. A spur gear 7 mounted for rotation about a fixed arbor 8 parallel to the spindle 2 meshes with the teeth 6 and is formed with a sleeve 9 which rotates on the arbor 8. Referring now also to FIGURE 2, the sleeve 15 is formed with a rim 10 which has a projecting tongue 11. A collar 12 is frictionally mounted on the sleeve 9 and has a projecting tongue 11. A collar 12 is frictionally mounted on the sleeve 9 and has a projecting finger 13.

The operation of the motor 1 when its stator windings are first energised will now be described. The torque applied to the rotor 1 of the motor 1 when its stator windings are first energised is dependent on the angular position of the rotor poles with respect to the stator poles. The torque may be sufficient to cause the rotor to start rotating in either direction or may only be sufficient to cause the rotor to vibrate about its angular position. If the rotor merely vibrates the vibrations are transmitted from the spindle 2 through the hairspring 3 to the flywheel 4. The flywheel 4 vibrates about the axis 5 and its vibrations and consequently those of the rotor 1 build up until their amplitude exceeds 6° when the torque applied to the rotor is sufficient to start it rotating in one direction. If the spindle 2 is rotated in the clockwise direction (as viewed from the direction of the arrow A, and as seen in FIGURE 2), the gear 7, the sleeve 9 and the collar 12 are rotated in the anti-clockwise direction but the rim 10 is rotated in the clockwise direction. The finger 13 is, in consequence, rotated until it collides with the tongue 11 when an impulse is generated. The impulse thus generated is sufficient to start the rotor rotating in the anticlockwise direction. When the spindle 2 is rotating in the anticlockwise direction the finger 13 is rotated in the clockwise direction until it engages a block 16 in the casing 14 of the clock, when the collar 12 slips on the sleeve 9. The spindle 2 then continues rotating in the anticlockwise direction and the finger 13 never collides with the tongue 11.

The gear 7 engages with a spur gear 17 formed at one end of a cylindrical member 18 which is integrally moulded from a plastics material and is rotatable eccentrically about an axis 19 parallel to the axis 5. The member 18 is rotatable about a shaft 59 projecting from the casing 14 and a spindle 20 which passes through it. The spindle 20 carries at its right hand end a centre seconds hand (not shown). A cluster of two gears 21 and 22 mounted at the other end of the member 18 is integrally moulded from a plastics material and is rotatable about the axis 23 of the member 18. The gear 21 which has a larger diameter than the gear 22 engages a fixed internal ring gear 24 formed on a part of the casing 14. The gear 22 engages an internal rotatable ring gear 25, which is splined to the spindle 20 (indicated at 26). The gear 25 which is moulded from a plastics material is formed with a hub 27, having an axis 28. A cluster of two gears 29 and 30 is moulded from a plastics material and is rotatably mounted on the hub 27, the gear 29 which has the larger diameter engaging an internal ring gear 31 frictionally mounted within a cylindrical part 49 of the casing 14 in the manner described below. The gear 30 engages an internal ring gear 32 integrally moulded from a plastics material with a member 33 which is rotatable about the spindle 20. The member 33 is provided with a sleeve 34 which surrounds the spindle 20 and carries a minute hand (not shown) and has two gears 35 and 36 formed on it, the gear 35 having the larger diameter. The gear 36 engages a spur gear 37 which is the larger of an internally moulded cluster of two plastics gears 37 and 38 mounted for rotation about an axis 39. The gear 38 engages a spur gear 40 which is rotatably mounted on the sleeve 34 and is integrally moulded from a plastics material with a sleeve 41 surrounding the sleeve 34. The sleeve 41 carries an hour hand (not shown). The gear 35 engages a spur gear 42 which is splined to a spindle 43 which lies along the axis 39. The gear 42 has a sleeve 44 surrounding the spindle 43, on which the cluster of gears 37 and 38 are mounted. A knob 45 is fixed to the spindle 43 and lies outside the casing 14.

Figure 3:
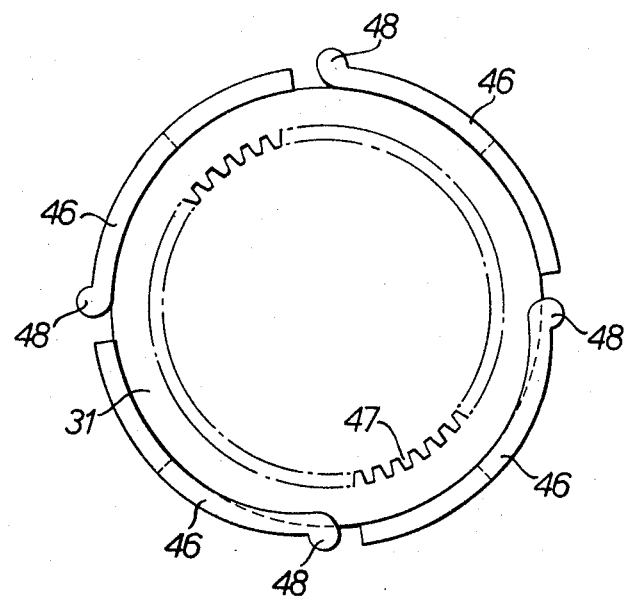

Referring now also to FIGURE 3 the ring gear 31 is moulded from a plastics material and has a shallow cup shape with the teeth 47 formed on a central hole in the base of the cup. Four portions 46 of the wall are cut away from the base and are provided with radially extending protrusions 48 at their extremities. When the ring gear 13 is pushed into the cylindrical part 49 the protrusions 48 are deflected inwards but as they are made of resilient material they frictionally engage the part 49. The bottom and right hand protrusions 48 in FIGURE 3 are shown in the positions to which they are deflected when the ring gear 31 is inserted into the cylindrical part 49.

The operation of the clock will now be described. The motor 1 when energised with an A.C. supply at 50 c./s. drives the spindle 2 in the clockwise direction (as viewed from the direction of the arrow B) at 200 r.p.m. The gear 7 is driven in the anticlockwise direction and the gear 17 in the clockwise direction so that the axis 23 of the member 18 rotates in the clockwise direction about the axis 19. The cluster of gears 21 and 22 rotate in the anticlockwise direction about the axis 23, and the ring gear 25, of the member 27 and the spindle 20 rotate in the clockwise direction at 1 r.p.m. about the axis 19. The cluster of gears 29 and 30 rotates in the anticlockwise direction about the axis 28 which in turn rotates in the clockwise direction. The ring gear 32 of the member 33 rotates in the clockwise direction at 1 revolution per hour about the axis 19, while the ring gear 31 remains fixed. The gear 37 rotates in the anticlockwise direction about the axis 39 and gear 40 and the sleeve 41 rotate at one revolution every twelve hours about the axis 19. The gear 42 the spindle 43 and the knob 45 are also rotated about the axis 39. The knob 45 may be rotated by hand in either direction rotating the member 33 through gears 35 and 42, and altering the indication given by the hands, carried on the sleeves 34 and 41. The ring gear 32 then rotates the cluster of gears 29 and 30 about the axis 28. The gear 29 rotates the ring gear 31 which slips in the cylindrical part 49. The inverse of the mechanical advantage of the remainder of the gear train back to the motor is such that the component gears cannot be rotated by rotating the knob 45.

I claim:
1. A timing mechanism comprising a motor, a reduction gear train driven by the motor and having an output member, adjusting means operatively connected to the reduction gear train and operable to adjust the position of the output member, the reduction gear train having at least a stage comprising an integral cluster of two external gears centred about a first axis, the said member being arranged to be driven about a second axis so that the first axis rotates about the second axis, a fixed internal gear which is centred on the second axis and with which one of the external gears is in mesh, and a rotatable internal gear rotatable about and centred on the second axis, the rotatable internal gear being in mesh with the other external gear, and a support, the fixed internal gear being frictionally carried by the support so that operation of the adjusting means causes the fixed internal gear to slip with respect to the support.

2. A timing device as claimed in claim 1 wherein the support is cylindrical and the internal gear is mounted within the support.

3. A timing device as claimed in claim 1 wherein the cluster, the fixed internal gear and the rotatable external gear are moulded from a plastics material.

No references cited.

RICHARD B. WILKINSON, *Primary Examiner.*